July 15, 1969 R. A. McMASTER 3,455,670
HEAT EXCHANGE APPARATUS FOR TREATING GLASS
Filed May 9, 1966 2 Sheets-Sheet 1

INVENTOR.
Ronald A. McMaster
BY
Barnard, McGlynn & Reising
ATTORNEYS

INVENTOR.
Ronald A. McMaster
BY
Barnard, McGlynn Reising
ATTORNEYS

३,४५५,६७०
Patented July 15, 1969

3,455,670
HEAT EXCHANGE APPARATUS FOR TREATING GLASS
Ronald A. McMaster, Genoa, Ohio, assignor to Permaglass Inc., Woodville, Ohio, a corporation of Ohio
Filed May 9, 1966, Ser. No. 548,737
Int. Cl. C03b 27/00
U.S. Cl. 65—182
9 Claims

ABSTRACT OF THE DISCLOSURE

An apparatus for transferring heat between a sheet of material and a fluid and including first means defining a first plurality of inlet passages for conveying fluid to the sheet and second means defining a plurality of exhaust passages for conveying fluid away from the sheet. There are at least twice as many inlet passages as exhaust passages and each exhaust passage is surrounded by only six inlet passages and each inlet passage is surrounded by three exhaust passages.

---

The instant invention relates to a method and apparatus for transferring heat between a sheet of glass and a fluid and, more specifically, to a flow control means for directing fluid to and away from a sheet of glass under optimum flow conditions whereby a sheet of glass may be tempered in a manner such that the heat transfer from the glass to the fluid is maintained over the surface of the glass at a degree of uniformity not heretofore attainable.

In the tempering of a sheet of glass it is desirable to uniformly temper the glass over the entire surface thereof. To accomplish a uniform temper in a sheet of glass, it is necessary to establish a uniform heat transfer rate from the glass to the fluid over the entire area of the glass during the period of tempering. Among other factors, the tempering of glass depends upon the mass flow rate of cool fluid contacting the glass. In other words, the greater the volume of fluid which contacts the glass, the greater the amount of heat which is transferred to the fluid, and the faster the fluid contacts and leaves the glass, the faster the heat will be conveyed from the glass. In addition, a maximum amount of heat is transferred from the glass to the fluid when the fluid is impinged against the glass. That is to say, when the fluid is not impinged against the glass, as when the fluid travels parallel to the glass, an insulating boundary layer film is formed on the glass surface and greatly reduces the heat transfer from the glass to the fluid.

Theoretically, therefore, a sheet of glass could be uniformly tempered if the entire area of the glass could be simultaneously impinged by the greatest mass flow rate of fluid possible. This, however, is impossible in that a large area of glass cannot be simultaneously impinged by fluid flow because there must be an exhaust route for the fluid to follow after it has impinged the glass. Thus, if a large area of a sheet of glass is simultaneously impinged with fluid flow, the fluid after having impinged the glass moves parallel to the glass to move to an area of low pressure, hence forming an insulating boundary layer film at the surface of the glass which in turn reduces the impingement and prevents a uniform tempering over the entire surface of the glass.

Consequently, systems of a type heretofore utilized for tempering glass have employed a plurality of inlets to impinge fluid upon the glass with a plurality of exhausts disposed adjacent the inlets so that once the fluid has impinged upon the glass it moves to the exhausts. In such systems, the fluid, after it has impinged the glass, moves parallel to the glass to an adjacent exhaust. Such parallel flow, as alluded to previously, establishing in insulating boundary layer film on the glass surface thus preventing a uniform temper over the entire surface of the glass.

Systems heretofore utilized for temperaing glass normally include a surafce with a plurality of exhaust passages and spaced among a plurality of inlet passages. The relationship between the inlet passages and the exhaust passages in the systems heretofore utilized have not satisfied all the requirements necessary for optimum tempering of a sheet of glass. As alluded to previously, it is desirable to provide a maximum volume of fluid flow at a maximum velocity through the inlet passages thereby to convey the maximum amount of heat from the glass in as short a time as possible. The greater the mass flow rate of the fluid through the inlets, however, the greater the aggregate area of the inlets must be, and as the aggregate area of the inlets is increased, the area of the surface available for exhausts decreases. The exhausts, however, must have an aggregate area much larger than the aggregate area of the inlets to provide a low pressure area for the fluid to flow once it has impinged the glass. Likewise, it is desirable to maximize the impingement area, i.e., the aggregate area of glass impinged by fluid from the inlets. Again, however, the total aggregate area of the inlets is restricted by the requirement to provide a sufficient aggregate area for the exhausts.

Accordingly, it is an object and feature of this invention to provide an apparatus for tempering a sheet of glass having a pattern of inlet passages and exhaust passages therein whereby a sheet of glass may be tempered to a degree of uniformity heretofore unattainable.

Another object and feature of this invention is to minimize the static flow and/or parallel flow area between the inlets and the adjacent exhausts while at the same time maintaining each inlet at equal distance from adjacent exhausts so that the impinging fluid flow from one inlet does no tadversely effect the fluid from another inlet.

Still another object and feature of the instant invention is to provide an apparatus for tempering a sheet of glass having a pattern of inlet passages and exhaust passages therein in a combination with other features whereby the mass flow rate of fluid, the area of the glass impinged by the fluid, the aggregate area of the exhaust passages, and the aggregate area of the inlet passages are all maximized to a degree commensurate with a minimum static or low flow area and a minimum distance between inlet and exhaust passages.

In general, these and other and features of this invention may be attained by an apparatus including first and second oppositely disposed flow directing units each of which has a first wall which is substantially parallel and spaced from the first wall of the other unit whereby a sheet of glass may be disposed between the units for tempering. A duct means supplies fluid to the plenum chambers formed by each of the units. A plurality of inlet passages are disposed in each of the first walls of the units for supplying fluid from the respective plenum chambers to the space between the units. A plurality of exhaust passages are included which extend through each of the units so that fluid exhausts from the space between the units to atmosphere. There are at least twice as many inlet passages as exhaust passages per unit area and each inlet passage is equally spaced from at least three surrounding exhaust passages. That is, the inlet and exhaust passages are arranged in a pattern so that each exhaust passage is surrounded by at least six equally spaced inlet passages. Suct a pattern provides a fluid flow for uniformly tempering a sheet of glass to a degree heretofore unattainable.

Other objects and attendant advantages of the present invention will be readily appreciated as the same becomes better understood by reference to the following detailed description when considered in connection with the accompanying drawings wherein:

FIGURE 1 discloses a preferred embodiment of the apparatus of the instant invention;

Figure 1:
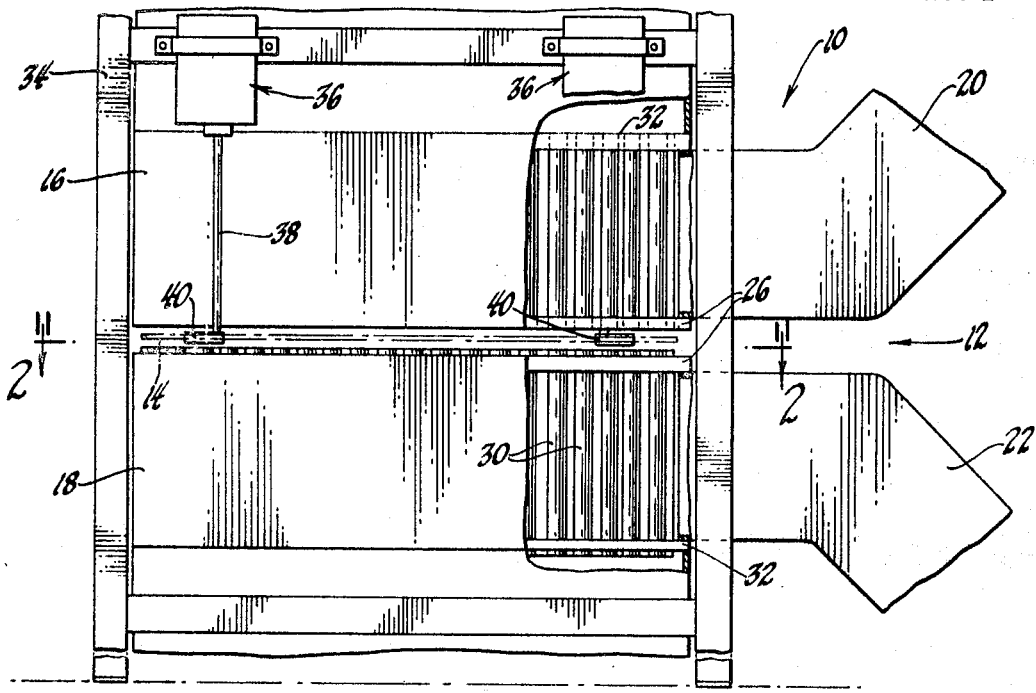

Referring now to the drawings, wherein like numerals indicate like or corresponding parts throughout the several views, an apparatus for transferring heat between a sheet of glass and a fluid is generally shown at 10. The heat treating apparatus 10 is frequently called a blasthead and includes a flow control means generally shown at 12 for directing fluid to and away from a sheet of glass 14. The flow control means 12 includes the first and second oppositely disposed flow directing units 16 and 18 and the duct means which includes the ducts 20 and 22.

The units 16 and 18 are secured to the framework 34 by appropriate means such as welding, bolting or the like. Each of the units 16 and 18 has a plenum chamber 24 therein and the ducts 20 and 22 supply fluid to the plenum chamber 24 of each unit. The units 16 and 18 each have a first wall 26 which is substantially parallel and spaced from the first wall 26 of the other unit. The sheet of glass 14 is disposed in the space between the walls 26 of the respective flow directing units 16 and 18.

A plurality of inlet passages 28 are disposed in each of the walls 26 for supplying fluid from the plenum chambers 24 to the space between the walls 26 for impinging upon the sheet of glass 14. A plurality of exhaust passages 30, formed by tubes, are also included. The exhaust passages 30 extend through the respective walls 26, through the respective plenum chambers 24, and through the second walls 32, and thereby extend through respective units so that the fluid, after impinging the sheet of glass 14, flows through the exhaust passages 30 to atmosphere.

Figure 2:
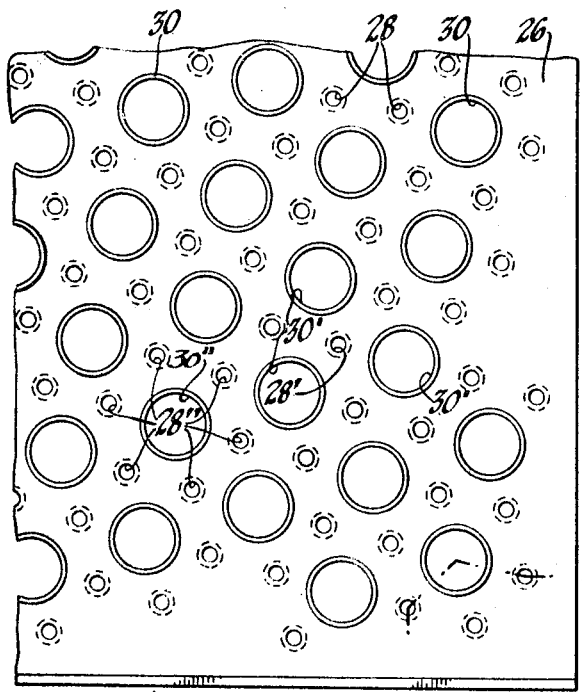
FIGURE 2 is an enlarged fragmentary cross-sectionel view taken substantially along line 2—2 of FIGURE 1.
Figure 3:
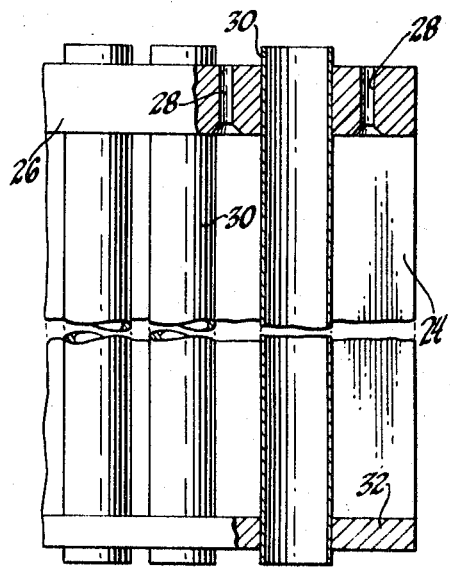
FIGURE 3 is a fragmentary cross-sectional view taken substantially along line 3—3 of FIGURE 2.
Figure 4:
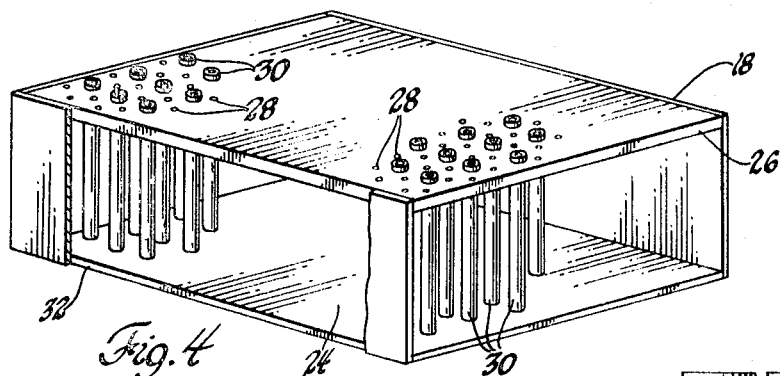
FIGURE 4 is a perspective view partly cut away of a flow directing unit untilized in the apparatus illustrated in FIGURE 1.

As most clearly shown in FIGURE 2, there are twice as many inlet passages 28 as exhaust passages 30 per unit area of the respective walls 26. However, each inlet passage 28 is equally spaced from three surrounding exhaust passages 30. More specifically, the inlet passage 28' is equally spaced from the three exhaust passages 30'. In addition, the distance from the periphery of each inlet passage 28 to the periphery of any one of the surrounding exhaust passages 30 is less than the distance to the periphery of the nearest inlet passage; thus, the adverse effects of the fluid supplied through each inlet 28 on the fluid supplied through the adjacent inlets 28 is minimized to increase the heat transferred to the fluid from the glass 14. Also, each exhaust passage 30 is surrounded by six equally spaced inlet passages 28. More specifically and by way of example, the exhaust passage 30" is surrounded by the six equally spaced inlet passages 28". Furthermore, each inlet passage 28 is positioned in an offset and overlapping relationship with respect to the adjacent inlet passages both in a direction longitudinally of the respective units 16 and 18 and in a direction transverse the longitudinal axis of the respective units 16 and 18. Hence, each exhaust passage 30 is also positioned in an offset and overlapping relationship with respect to adjacent exhaust passages 30 both in a direction longitudinally of the units 16 and 18 and in a direction transverse the longitudinal axis of the units 16 and 18. This overlapping relationship is important when the glass 14 is moved relative to the units 16 and 18, which movement is more fully explained hereinafter. In addition, the aggregate area of the exhaust passages 30 is larger than the aggregate area of the inlet passages 28 per unit area, and preferably the aggregate area of the exhaust passages 30 is at least six times the aggregate area of the inlet passages 28 in a given unit area. By providing a larger aggregate area of exhaust passages than inlet passages, the back pressure is minimized so that after the fluid impinges the glass sheet 14, it rapidly flows to and through the low pressure exhaust passages. Back pressure, i.e., pressure created by a restricted exhaust path, is proportional to the square of the velocity of the flow and the velocity is proportional to the flow area. Therefore, when the aggregate area of the exhaust passages is six times the aggregate area of the inlet passages, the pressure in the exhaust passages is $\frac{1}{36}$ the fluid pressure in the inlet passages.

As illustrated in FIGURE 1, the glass sheet 14 is supported on fluid between the horizontally disposed flow directing units 16 and 18 so that the glass sheet 14 floats on or is supported by the fluid ejected from the inlet passages 28 in the lower unit 18. It will be understood, of course, that the units 16 and 18 may be disposed vertically with the sheet of glass 14 supported by tongs, or other implements, between the walls 26 of the restrictive units for tempering.

The is also included means, generally indicated at 36, for providing repetive or oscillatory movement of the sheet 14 relative to the units 16 and 18 to effect a substantially uniform transfer of heat over the entire sheet. The means 36 takes the form of motors having shafts 38, each of which depends from a motor, to support a finger 40 on the lower end. Four such motors are utilized, two on each side of the apparatus (only the motors on one side are shown). The fingers 40 are rotated into the space between the walls 26 by the motors. The fingers 40 have a microswitch (not shown) thereon so that, when the glass sheet 14 contacts the microswitch, the motors are operated to rotate the shafts 38 and move the fingers 40 between the walls 26 to push the glass sheet 14 toward the opposite side of the apparatus. When the glass sheet 14 reaches the opposite side of the apparatus, it contacts the fingers 40 on the opposite side of the apparatus and is pushed in the opposite direction in the space between the walls 26. Hence, the glass sheet 14 is provided with an oscillatory or repetive motion. It is to be understood, however, that many other devices may be utilized to provide relative movement between the glass sheet 14 and the apparatus. For example, the apparatus disclosed and claimed in copending application Ser. No. 548,752 filed May 9, 1966, in the name of Harold A. McMaster and assigned to the assignee of the instant invention may be utilized for moving the glass sheet relative to the apparatus of the instant invention.

The pattern of inlet passages 28 and exhaust passages 30 is an optimum pattern since all the beneficial effects of the parameters significant to tempering a sheet of glass are maximized to a degree heretofore unattainable. That is to say, the pattern disclosed maximizes the mass flow rate to provide a high volume of air which impinges the glass sheet 14 and rapidly flows to the exhaust passages. At the same time and due to the number of inlets 28, the area of the glass sheet 14 impinged by fluid being ejected from the inlet passages 28 is maximized. Yet, each inlet 28 is positioned closer to an exhaust passage than to an adjacent inlet passage so that fluid being ejected from a particular inlet passage will flow directly to an exhaust passage, thus minimizing the static and/or low flow areas which inhibit adequate tempering of the glass. Furthermore, the aggregate area of the exhaust passages 30 is sufficient to provide a very low exhaust pressure and is sufficient to accommodate the large mass flow rate of fluid being ejected from the inlet passages 28. Such a pattern provides a greatly improved tempered sheet of glass.

Figure 5:
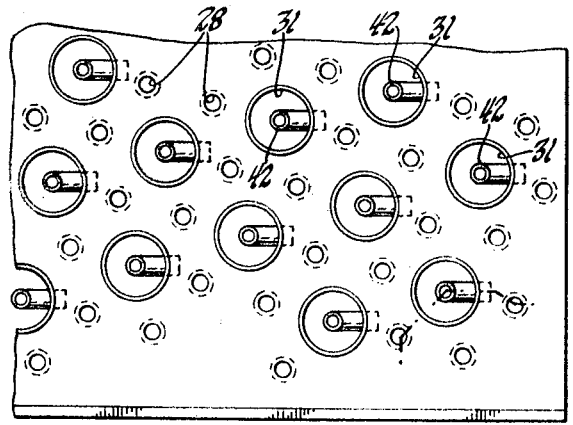
FIGURE 5 is an enlarged fragmentary view of an alternative embodiment of a flow directing unit which can be utilized in the apparatus illustrated in FIGURE 1.
Figure 6:
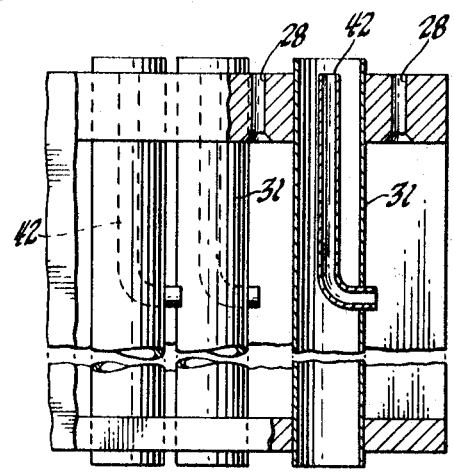
FIGURE 6 is a fragmentary cross-sectional view taken substantially along line 6—6 of FIGURE 5.

Referring now to FIGURES 5 and 6, there is shown an alternative embodiment of a flow directing unit which may be used in the apparatus 10. The module illustrated in FIGURES 5 and 6 is similar to the units 16 and 18 illustrated in FIGURES 1 through 4 and differs therefrom by the inclusion of the additional inlet passages 42. The inlet passages 42 are disposed centrally within each exhaust passage 31. Each additional inlet passage 42 extends through the wall of the exhaust passages 31 and then extends upwardly centrally of the exhaust passages 31 for providing a fluid flow from the plenum chamber to impinge the sheet of glass being tempered.

Figure 7:
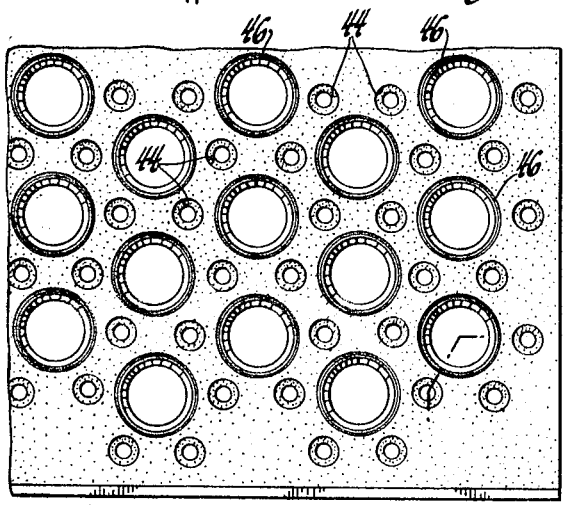
FIGURE 7 is a fragmentary view of yet another alternative embodiment of a flow directing unit which may be utilized in the apparatus illustrated in FIGURE 1.
Figure 8:
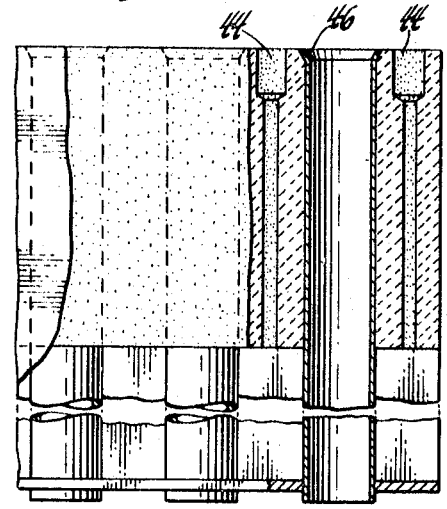
FIGURE 8 is a fragmentary cross-sectional view taken substantially along line 8—8 of FIGURE 7.

Yet another modification or variation of the units is illustrated in FIGURES 7 and 8. It will be noted that the inlets in the units disclosed in FIGURES 7 and 8 are counterbored at 44. The periphery of each counterbore 44 acts as a restriction to fluid flow as a sheet of glass floats thereover and approaches the periphery of each counterbore 44 so that the fluid pressure is increased in the counterbore 44 to move the sheet away from the periphery of the counterbore and to maintain the sheet a predetermined distance from the periphery of the counterbore. It will also be noted that the exhaust passages disclosed in FIGURES 7 and 8 are flared and are flush with the top surface of the unit as is indicated at 46. The units illustrated in FIGURES 7 and 8 may be utilized for floating a glass sheet thereover in that the glass sheet will be maintained above the upper surface of the unit by the buildup in pressure in the respective counterbores 44 as explained above. The units as illustrated in FIGURES 1 through 6, however, utilize exhaust passages 30 and 31 which extend above the upper surface of the unit and utilize inlet passages 28 which are not counterbored. A sheet of glass is floated or supported above the protruding portions of the exhaust passages 30 and 31 on a film of fluid. Briefly, the pressure builds up between the inlet passages 28 and the exhaust passages 30 or 31 to support the sheet of glass. The support of a sheet of glass above the extending exhaust passages is the subject matter of copending application Ser. No. 548,532 filed May 9, 1966, in the names of Harold A. McMaster and Ronald A. McMaster and assigned to the assignee of the instant invention. It is to be understood, therefore, that the extension of the exhaust passages 30 and 31 and the beneficial results attained thereby form no part of the instant invention since the instant invention is related to the particular pattern of inlet passages and exhaust passages in combination with various other features hereinbefore described. It is also to be understood that although the invention has been described in terms of quenching or tempering glass, it also may be utilized to heat glass by transferring heat from fluid flowing through the pattern of inlet passages and exhaust passages to the glass sheet.

The upper wall in the unit disclosed in FIGURES 7 and 8 is preferably made of a material such as a ceramic, a sintered fused quartz, or the like.

Although the pattern of inlets and exhausts has been described as formed of a plurality of equilateral triangles, it is to be understood that the pattern could be slightly modified by disposing six inlets about an exhaust so that the inlets are not all an equal distance from the exhaust while remaining within the scope of the instant invention.

The invention has been described in an illustrative manner and it is to be understood that the terminology which has been used is intended to be in the nature of words of description rather than of limitation.

The embodiments of the invention in which an exclusive property or privilege is claimed are defined as follows:

In the claims:

1. In an apparatus for transferring heat between a sheet of material and a fluid including first means defining a first plurality of inlet passages for conveying fluid to the sheet and second means defining a plurality of exhaust passages for conveying fluid away from the sheet and flow control means for conveying fluid to and from said inlet and exhaust passages respectively, the improvement comprising there being at least twice as many inlet passages as exhaust passages, each of said exhaust passages being surrounded by only six inlet passages and each of said inlet passages being surrounded by three of said exhaust passages, the cross sectional area of each exhaust passage being greater than the cross sectional area of each inlet passage.

2. An apparatus as set forth in claim 1 wherein said six inlet passages are equally spaced about each exhaust passage and said three exhaust passages are equally spaced about each inlet passage so that an imaginary line extending between the centers of the three exhaust passages surrounding each inlet passage will form an equilateral triangle and an imaginary line extending between the centers of the six inlet passages surrounding each exhaust passage will form a hexagon.

3. An apparatus as set forth in claim 1 wherein the distance from the periphery of each inlet passage to the periphery of any one of said surrounding exhaust passages in less than the distance to the periphery of the nearest inlet passage.

4. An apparatus as set forth in claim 1 wherein the aggregate area of said exhaust passages is at least six times the aggregate area of said inlet passages.

5. An apparatus as set forth in claim 1 wherein said first and second means define a surface and said passages are disposed in said surface such that the fluid supplied by said inlet passages supports the sheet on a film of fluid over said surface.

6. An apparatus as set forth in claim 1 including a second plurality of inlet passages each of which is concentrically disposed in one of said exhaust passages.

7. An apparatus as set forth in claim 1 wherein said first and second means and said flow control means include at least one flow directing unit having spaced first and second walls and duct means for supplying fluid into a plenum chamber formed between said walls of said unit, said inlet passages extending through said first wall to provide fluid communication from said plenum chamber to the exterior of said unit, said exhaust passages extending through said first wall, through said plenum chamber and through said second wall to provide a fluid flow path from adjacent said inlet passages to atmosphere.

8. In an apparatus for transferring heat between a sheet of glass and a fluid which comprises a flow directing unit having a first wall, duct means for supplying fluid to the plenum chamber formed by said unit, a first plurality of inlet passages in said first wall for supplying fluid from said plenum chamber to the space over said first wall, and a plurality of exhaust passages in said first wall for exhausting fluid from the space over said first wall to atmosphere, the improvement comprising; there being twice as many inlet passages as exhaust passages per unit area of said first wall and each inlet passage being substantially equally spaced from at least three surrounding exhaust passages, each of said exhaust passages being surrounded by only six equally spaced inlet passages, the cross sectional area of each exhaust passage being greater than the cross sectional area of each inlet passage.

9. An apparatus as set forth in claim 8 wherein the distance from the periphery of each inlet passage to the periphery of any one of the adjacent surrounding exhaust passages is less than the distance to the periphery of the nearest inlet passage.

References Cited

UNITED STATES PATENTS

| | | | |
|---|---|---|---|
| 2,080,083 | 5/1937 | Magnien | 65—348 |
| 2,298,709 | 10/1942 | Long | 65—348 |
| 3,332,761 | 7/1967 | Fredley et al. | 65—182 X |

S. LEON BASHORE, Primary Examiner

A. D. KELLOGG, Assistant Examiner

U.S. Cl. X.R.

65—25, 104, 114, 350, 351; 214—1